UNITED STATES PATENT OFFICE.

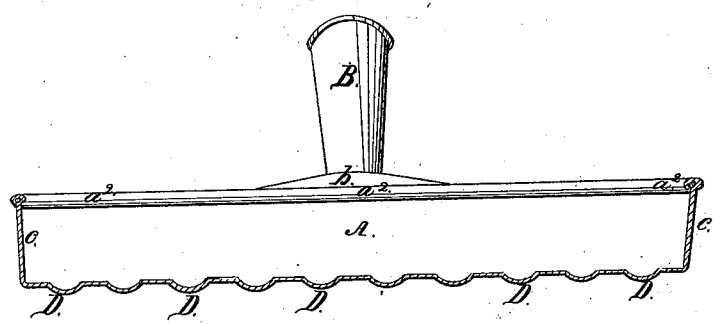
J. H. Rohrman,
Dust Pan,
Nº 24,331. Patented June 7, 1859.
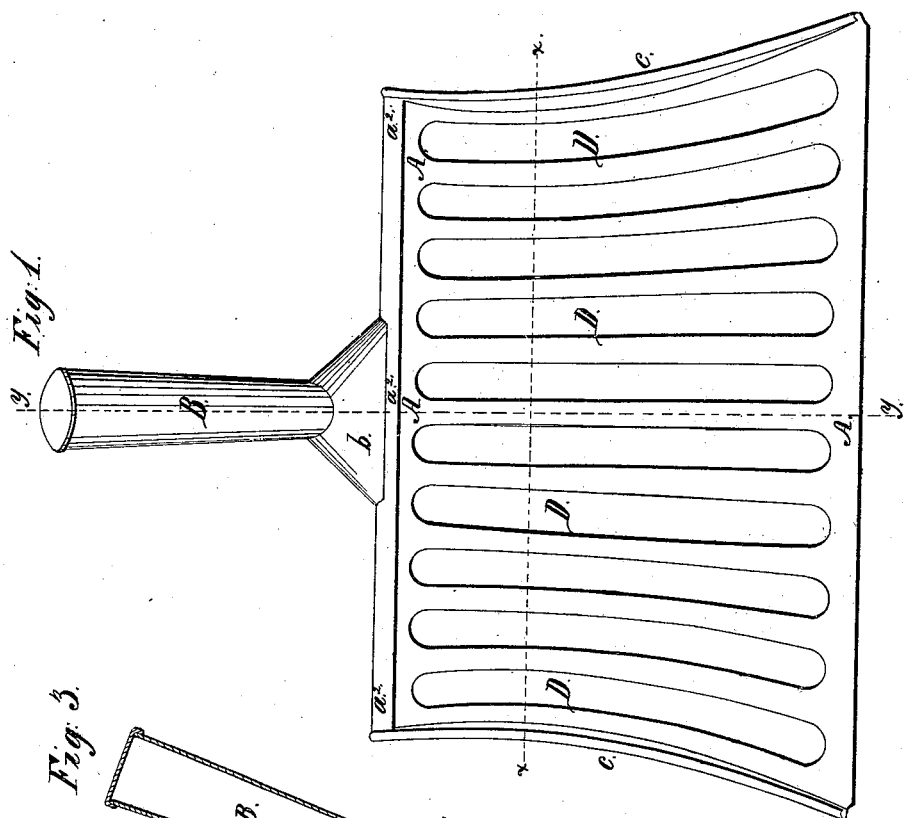
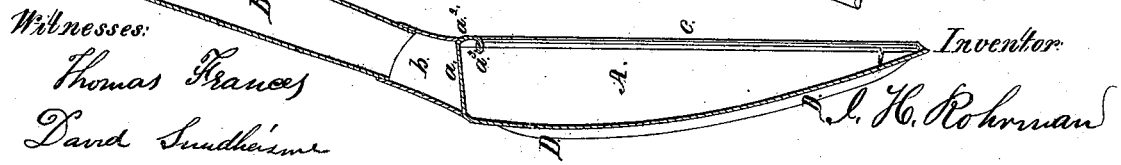
Witnesses:
Thomas Frances
David Sundheim
Inventor
J. H. Rohrman

JOSEPH HALL ROHRMAN, OF PHILADELPHIA, PENNSYLVANIA.

DUST-PAN.

Specification forming part of Letters Patent No. 24,331, dated June 7, 1859; Reissued August 6, 1867, No. 2,721.

*To all whom it may concern:*

Be it known that I, J. HALL ROHRMAN, of Philadelphia, county of Philadelphia, in the State of Pennsylvania, have invented new and useful Improvements in Dust-Pans; and I do hereby declare that the following is a full and exact description thereof, reference being had to the accompanying drawings and to the letters of reference marked thereon.

In the ordinary construction of dust pan, the bottom of the pan is formed of a plain sheet of metal and the handle is formed with a tongue extending some distance along on the under side of the bottom of the pan and soldered thereto, to give rigidity to it, in order that when the pan be pressed down to the floor to receive the dust it shall not bend up at its front and middle portion; but practice has proven that a great objection exists in a dust pan so formed viz: the liability of the tongue of the handle which runs along under the bottom of the pan and is soldered thereto, to become loosened from the pan by the strain brought upon it when the front edge of the pan is pressed down (from the handle) upon the floor. It has been customary also in making dust pans to wire the upper edge of the back side of the pan (to which the handle is partially attached) to give it rigidity.

To construct a dust pan which shall not be subject to the objection above alluded to and which shall be in every other way more lasting and desirable than the ordinary construction of dust pan, and which shall not require to have the upper edge of its rear side wired, is the object of my present invention; and to these ends my invention consists firstly in forming the bottom of a dust pan with corrugations (struck up in the usual manner) in such manner as to render it quite rigid, without any more weight or thickness of metal and thus avoid the necessity of running a tongue or portion of the handle along under the bottom of the pan. And my invention consists secondly in rendering the top edge of the rear side of the pan rigid by bending the metal forward at about right angles to the rear side extending it along about five sixteenths or three eighths of an inch, and then bending it downward and seaming it, as will be hereinafter described.

To enable those skilled to make and use my improvement, I will proceed to describe it, referring by letters to the accompanying drawings forming part of this specification and in which, Figure 1, represents a top view of my improved construction of dust pan. Fig. 2, represents a vertical section at the line $x$, $x$, of Fig. 1, and Fig. 3, represents a vertical section at the line $y$, $y$, of Fig. 1.

Similar letters denote the same parts in the different views.

A, represents the bottom of the pan which is illustrated as having formed in it a series of concaves or flutes D, removing from front to back, or as being corrugated. This corrugation is produced in the ordinary way, by striking up between dies and may be varied with regard to the number, shape or exact direction of the flutes so long as they are so formed as to render the bottom of the pan rigid against the tendency to bend caused by pressing its front edge down on the floor.

B, is the handle of the pan made in the usual manner but attached to the rear side only of the pan by means of a flaring connecting piece $b$.

$c$, are the sides of the pan formed in the usual way.

$a$, is the rear or back side of the pan which is run up to the usual height, but which instead of being wired to render it stiff is bent forward at $a^2$, and then downward and seamed under at $a^3$, (see Fig. 3).

By forming the bottom of the pan with corrugations substantially as shown and described it is made sufficiently stiff to render unnecessary any bracing by the handle, and by forming the upper edge of the back of the pan as described, it is rendered more rigid and desirable than those now made and without any wiring.

What I claim as a new article of manufacture and desire to secure by Letters Patent is—

A dust pan having its bottom corrugated and its back edge seamed over substantially as hereinbefore described for the purposes of making the bottom of the pan rigid without extending any brace from the handle and rendering unnecessary the wiring of the back edge of the pan.

In testimony whereof I have hereunto set my hand this 18th day of May 1859.

J. HALL ROHRMAN.

Witnesses:
THOMAS FRANCIS,
DAVID SUNDHEIMER.